United States Patent
Anghel et al.

(10) Patent No.: US 11,942,845 B2
(45) Date of Patent: Mar. 26, 2024

(54) STATOR COIL FOR HIGH POWER DENSITY AND EFFICIENCY ELECTRIC MACHINES

(71) Applicant: Honeywell International Inc., Charlotte, NC (US)

(72) Inventors: Cristian E. Anghel, Tucson, AZ (US); Tom Phielix, Tucson, AZ (US); Yongbae Jung, Torrance, CA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/301,725

(22) Filed: Apr. 17, 2023

(65) Prior Publication Data

US 2024/0055925 A1    Feb. 15, 2024

Related U.S. Application Data

(63) Continuation of application No. 16/859,984, filed on Apr. 27, 2020, now Pat. No. 11,632,006.

(51) Int. Cl.
*H02K 15/04* (2006.01)
*H02K 3/14* (2006.01)
*H02K 3/42* (2006.01)

(52) U.S. Cl.
CPC .............. *H02K 3/42* (2013.01); *H02K 3/14* (2013.01); *H02K 15/0428* (2013.01)

(58) Field of Classification Search
CPC .. H02K 3/14; H02K 3/12; H02K 3/28; H02K 1/26; H02K 23/28; H02K 23/30;
(Continued)

(56) References Cited

U.S. PATENT DOCUMENTS

| 5,714,824 A | 2/1998 | Couture et al. |
| 6,373,163 B1 | 4/2002 | Oohashi et al. |

(Continued)

FOREIGN PATENT DOCUMENTS

| EP | 2477317 A1 | 7/2012 |
| EP | 2916436 A1 | 9/2015 |

(Continued)

OTHER PUBLICATIONS

European Patent Office, "Extended European Search Report from Application No. 21168182.0", from Foreign Counterpart to U.S. Appl. No. 16/859,984, dated Oct. 5, 2021, pp. 1 through 10, Published: EP.

(Continued)

*Primary Examiner* — Leda T Pham
(74) *Attorney, Agent, or Firm* — Fogg & Powers LLC

(57) ABSTRACT

In one embodiment, a stator coil that includes a first turn with two or more strands is provided. The first turn includes first and second opposite sides, a coil termination at a first end of the first turn and an inversion region disposed at a second end, opposite the coil termination. The stator coil also includes at least one additional turn with two or more strands. The at least one additional turn includes first and second opposite sides, and an inversion region located adjacent to the inversion region of the first turn. The first and second sides of the first turn are inverted relative to the first and second sides of the at least one additional turn outside their respective inversion regions.

20 Claims, 14 Drawing Sheets

(58) Field of Classification Search
CPC ........ H02K 23/32; H02K 3/04; H02K 15/066; Y10T 29/49009
See application file for complete search history.

(56) References Cited

U.S. PATENT DOCUMENTS

| | | |
|---|---|---|
| 6,501,205 B1 | 12/2002 | Asao et al. |
| 6,806,612 B2 | 10/2004 | Nakamura et al. |
| 7,034,428 B2 | 4/2006 | Cai et al. |
| 7,265,472 B2 | 9/2007 | Mitcham |
| 7,474,303 B2 | 1/2009 | Shin et al. |
| 7,759,834 B2 | 7/2010 | Onimaru et al. |
| 8,878,413 B2 | 11/2014 | Wolf et al. |
| 10,411,562 B2 | 9/2019 | Anghel et al. |
| 10,715,013 B2 | 7/2020 | Anghel et al. |
| 11,081,924 B2 | 8/2021 | Anghel et al. |
| 2003/0230953 A1 | 12/2003 | Koike et al. |
| 2005/0206263 A1 | 9/2005 | Cai et al. |
| 2012/0161568 A1 | 6/2012 | Umemoto et al. |
| 2012/0319523 A1 | 12/2012 | Manabu et al. |
| 2019/0305621 A1 | 10/2019 | Oka et al. |
| 2021/0336505 A1 | 10/2021 | Anghel et al. |

FOREIGN PATENT DOCUMENTS

| | | |
|---|---|---|
| GB | 952752 A | 3/1964 |
| WO | 2014061406 A1 | 4/2014 |

OTHER PUBLICATIONS

U.S. Patent and Trademark Office, "Advisory Action", U.S. Appl. No. 16/859,984, dated May 13, 2022, pp. 1 through 3, Published: US.

U.S. Patent and Trademark Office, "Final Office Action", U.S. Appl. No. 16/859,984, dated Mar. 7, 2022, pp. 1 through 27, Published: US.

U.S. Patent and Trademark Office, "Notice of Allowance", U.S. Appl. No. 16/859,984, dated Dec. 14, 2022, pp. 1 through 10, Published: US.

U.S. Patent and Trademark Office, "Office Action", U.S. Appl. No. 16/859,984, dated Jun. 6, 2022, pp. 1 through 19, Published: US.

U.S. Patent and Trademark Office, "Office Action", U.S. Appl. No. 16/859,984, dated Sep. 30, 2021, pp. 1 through 26, Published: US.

European Patent Office, "Communication pursuant to Article 94(3)", from EP Application No. 21168182.0, from Foreign Counterpart to U.S. Appl. No. 16/859,984, dated Sep. 15, 2023, pp. 1 through 5, Published: EP.

STATOR COIL FOR HIGH POWER DENSITY AND EFFICIENCY ELECTRIC MACHINES

CROSS-REFERENCE TO RELATED APPLICATIONS

This application is a continuation of U.S. application Ser. No. 16/859,984, filed on Apr. 27, 2020, and titled "STATOR COIL FOR HIGH POWER DENSITY AND EFFICIENCY ELECTRIC MACHINES," which is incorporated herein in its entirety.

BACKGROUND

There is an increasing need for high-power generators in the 500-kilowatt (kW) to one megawatt (MW) range for hybrid-electric propulsion, directed energy weapons and other electric machines. At the same time, many of these applications cannot tolerate an increase in weight and volume of the generator used to achieve the increased power output.

Unfortunately, one byproduct of increased power output of an electrical generator conventionally is an increase in heat production due, at least in part, to electrical and mechanical losses in the operation of the generator. Typical power generators for aircraft and other vehicle are either air cooled or liquid cooled. Liquid cooling, typically with oil can be implemented in one of three ways: spray-cooled, conduction cooled or a combination of both spray and conduction. The spray cooling techniques provide very good heat extraction, but typically have the disadvantage of increased mechanical losses produced by windage in the generator. This is caused by oil being in contact with the rotor components of the generator that rotate at very high speeds. Further, these cooling systems add to the weight and size of the generator.

For a megawatt (MW) generator, a combination of conduction cooling of the rotor and stator back-iron, and spray-cooling of the stator end turns is very desirable. See, e.g., U.S. Pat. No. 10,411,562 and US Application Publication 2019/0372416. However, high power density generators may create additional electrical losses such that traditional methods of heat extraction are ineffective within the weight and size constraints of some electric machines. The AC losses in the stator conductors caused by eddy currents and proximity effect may dominate in the electrical losses of megawatt generators. Traditional cooling systems may not be effective for continuous operation at rated power and thereby limiting significantly the capabilities of the electrical machine.

Thus, there is a need in the art for high efficiency (low loss) megawatt generators such that the desired power levels can be achieved within the size and space constraints of the electric machines incorporating the generators.

SUMMARY

The Embodiments of the present invention provide a stator coil for high power density and efficiency electric machines and will be understood by reading and studying the following specification.

In one embodiment, a stator coil is disclosed that includes a first turn with two or more strands. The first turn includes first and second opposite sides, a coil termination at a first end of the first turn and an inversion region disposed at a second end, opposite the coil termination. The stator coil also includes at least one additional turn with two or more strands. The at least one additional turn includes first and second opposite sides, and an inversion region located adjacent to the inversion region of the first turn. The first and second sides of the first turn are inverted relative to the first and second sides of the at least one additional turn outside their respective inversion regions.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

Figure 1:
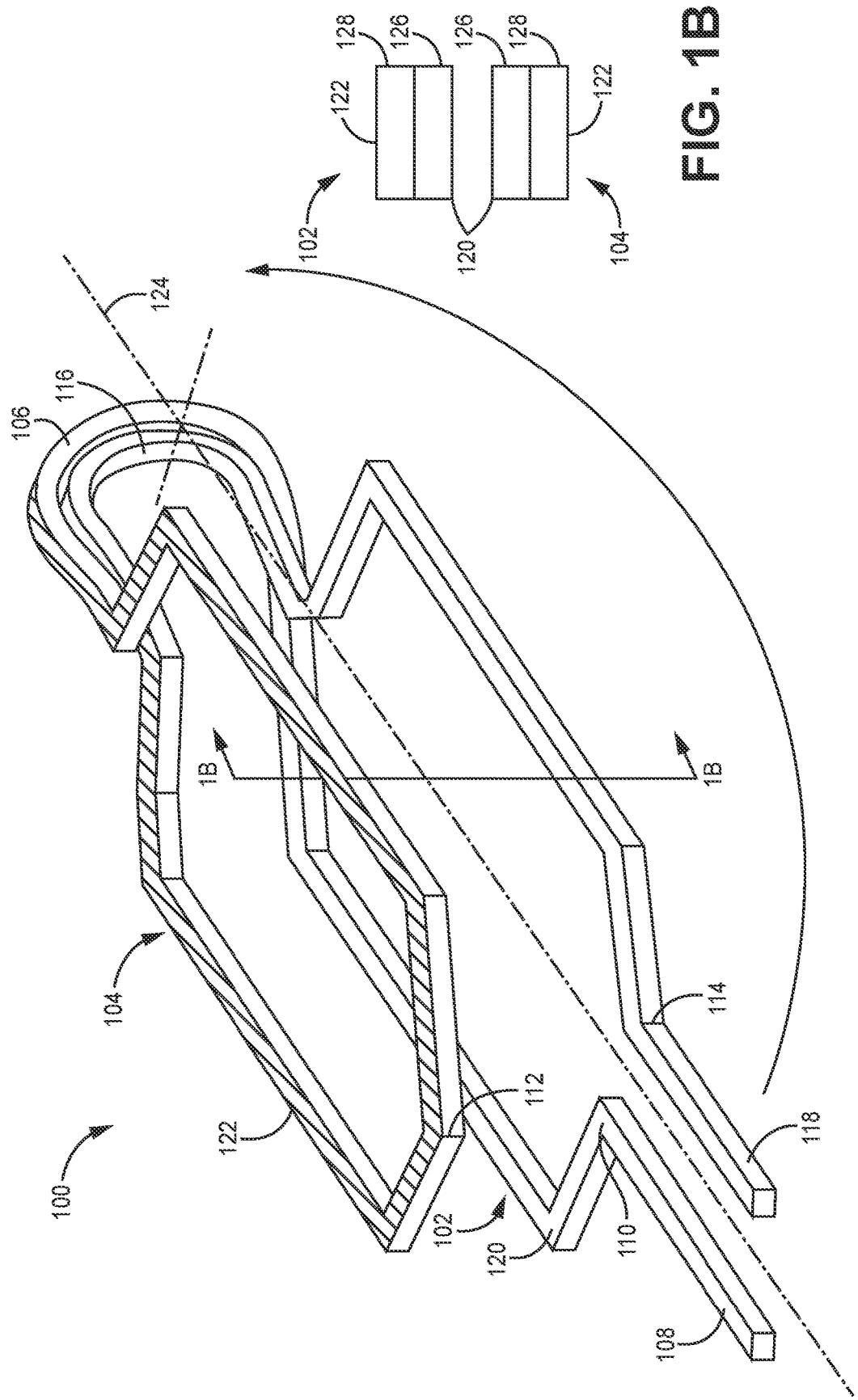
FIG. 1A is an exploded, perspective view of one embodiment of a stator coil formed from a conductor having two turns with each turn having two or more strands, and with one turn being inverted relative to the other turn.
FIG. 1B is a cross section of the conductor on one side of the stator coil of FIG. 1A.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide stator coils and a method of manufacturing the same that reduce AC copper losses with better copper slot fill factor and thermal characteristics than conventional methods currently employed. The copper slot fill factor is ratio of the cross-sectional area of the amount of copper conductors inside of a stator slot compared to the amount of total available space of a bare slot. High copper slot fill designs can allow for increased conductor area or decreased slot area to reduce losses. The most common method to reduce AC copper losses is to use round stranded conductors also known as Litz wires or continuously transposed cables (CTC).

Although the Litz wire has similar combined DC and AC loss with the method described in the present specification, the use of Litz wire has the following disadvantages:
 a. Decreased heat transfer coefficient of the stator winding;
 b. Significantly lower copper fill factor;
 c. Longer end-turns resulting in a larger generator; and
 d. Higher probability of stator insulation failure.

Currently, there are no CTC available with the dimensions required for the generator application targeted, but assuming that this can be overcome, the CTC has the following disadvantages when compared with the method proposed:
 a. Decreased heat transfer coefficient of stator winding,
 b. Lower copper fill factor by about 10%;
 c. Longer conductor along the slot within the magnetic length;
 d. Higher probability of stator insulation failure.

Embodiments of the present invention advantageously reduce the copper losses by a factor of 2.5 times versus typical rectangular conductors using multiple layers. For a high-power generator rated for 500-1,000 kW, this reduces AC copper loss by up to 15 kW. Thus, embodiments of the present invention increase the efficiency of the high-power machine and enables cooling with conventional approaches even when operating continuously at full power without exceeding its thermal limitation. Embodiments of the present invention advantageously may be used to provide power in Directed Energy Weapons (DEW) and Hybrid Electric Propulsion (HEP).

Embodiments of the present invention use a new winding configuration, as described more fully below, to reduce the AC losses by a factor of 2 or more by reducing the circulating current in layered parallel strands using an inversion of the layers between the turns of the coils. This inversion is implemented in some embodiments at the one side of the end-turns, such as the side without the coil terminations that will be connected to the generator terminals via bus rings. Although in one embodiment, the inversion is implemented only one time at the end-turns, the inversion has the benefits of CTC, Litz wires or Roebel bars, without the disadvantages presented above. Various embodiments are described in turn below.

Stator Coil with Two Turns

FIG. 1A illustrates a first embodiment of a stator coil, indicated generally at 100, according to the teachings of the present invention. In this embodiment, stator coil 100 includes two turns, first turn 102 and second turn 104. It is noted that the teachings of the present invention are not limited to embodiments of stator coils with two turns. In other embodiments, stator coils with more than two turns are contemplated. For example, embodiments of stator coils with three and four turns are specifically disclosed in more detail below. It is further contemplated that the teachings of the present invention can be extended to a stator coil with any appropriate number of turns.

For purposes of this specification, a "turn" is defined as a continuous length of conductor that forms a loop of the stator coil. For example, first turn 102 begins at 110 and ends at 112 and includes the contiguous portion of the conductor between those two points. Additionally, first turn 102 also includes inversion region 106 and coil termination 108. Second turn 104 begins at 112 and ends at 114. Second turn 104 also includes inversion region 116 and coil termination 118.

For pedagogical purposes, stator coil 100 is shown in an exploded view in FIG. 1A to better show the structure of the inversion regions 106 and 116 and the structure of the two turns. For purposes of this specification, the term "inversion region" means a length of conductor that is used to invert the orientation of the conductor such that the top surface of the conductor prior to the inversion region becomes the bottom surface of the conductor after the inversion region. In this view, the conductors of the first and second turns 102 and 104 are shown with no contact between the turns. This allows the top and bottom surfaces 120 and 122 of the conductor that forms the first and second turns 102 and 104 to be seen. When fully constructed, first and second turns 102 and 104 are brought into contact as shown in FIG. 2.

The conductor that forms first turn 102 and second turn 104 has first and second opposite sides or surfaces 120 and 122. The inversion region changes the relative position of the first and second sides 120 and 122 of the first and second turns 102 and 104 in stator coil 100. For example, as shown in FIG. 1A, first side 120 is on top of the conductor that forms first turn 102 from 110 to the point where first turn 102 enters inversion region 106. Where first turn 102 exits inversion region 106, second side 122 is located on top of first turn 102. Similarly, second side 122 is on top of the conductor that forms second turn 104 from 112 to the point where second turn 104 enters inversion region 116. When second turn 104 exits inversion region 116, first side 120 is the top surface of second turn 104. In this manner, overlapping portions of first and second turns 102 and 104 are inverted relative to each other in the loop portion of stator coil 100. In other words, the first and second sides of the first turn are inverted relative to the first and second sides of the second turn outside of their respective inversion regions 106 and 116.

In this embodiment, the conductor used to form the first turn 102 and the second turn 104 includes at least two strands: first strand 126 and second strand 128. The strands of stator coil 100 are shown in cross section in FIG. 1B and are substantially rectangular in cross section. Advantageously, this shape provides a better copper slot fill factor for stator coil 100 compared to other conductor shapes. FIG. 1B is a cross section of the first turn 102 and the second turn 104 along line 1B. As can be seen in FIG. 1B, the portion of first turn 102 that is to the right of a central axis 124 is oriented such that the first surface 120 is on the bottom of the conductor of the first turn 102. Further, the portion of the second turn 104 that is located to the right of the central axis 124 is oriented in an inverted relationship to the first turn 102 such that the first surface 120 is on top of the second turn 104. Similarly, on the opposite side of the central axis 124 of stator coil 100, the first surface 120 of the first turn 102 is adjacent to the first surface 120 of the second turn 104. Advantageously, this orientation (the first turn being inverted relative to the second turn) reduces the AC losses in stator coil 100 compared to conventional designs for stator coils.

Figure 2:
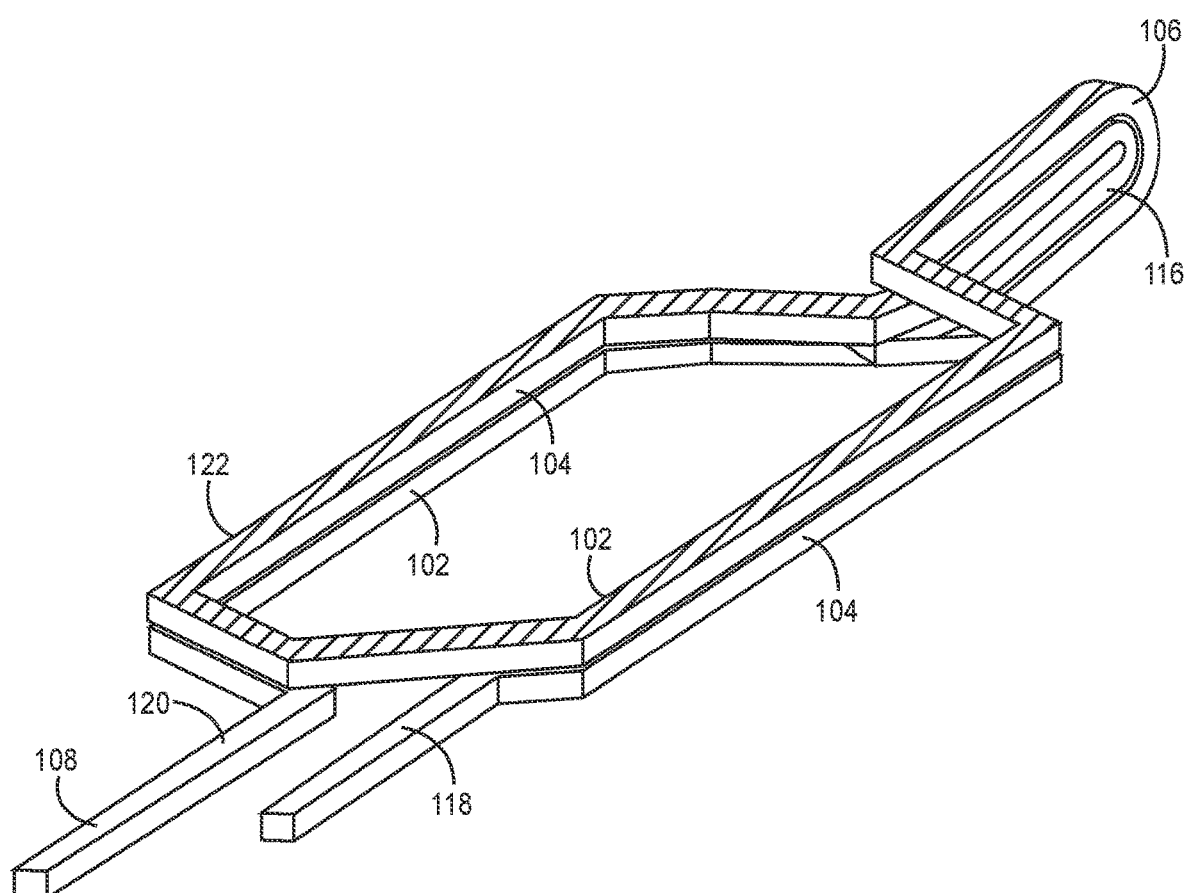
FIG. 2 is a perspective view of the embodiment of FIG. 1A.
Figure 3:
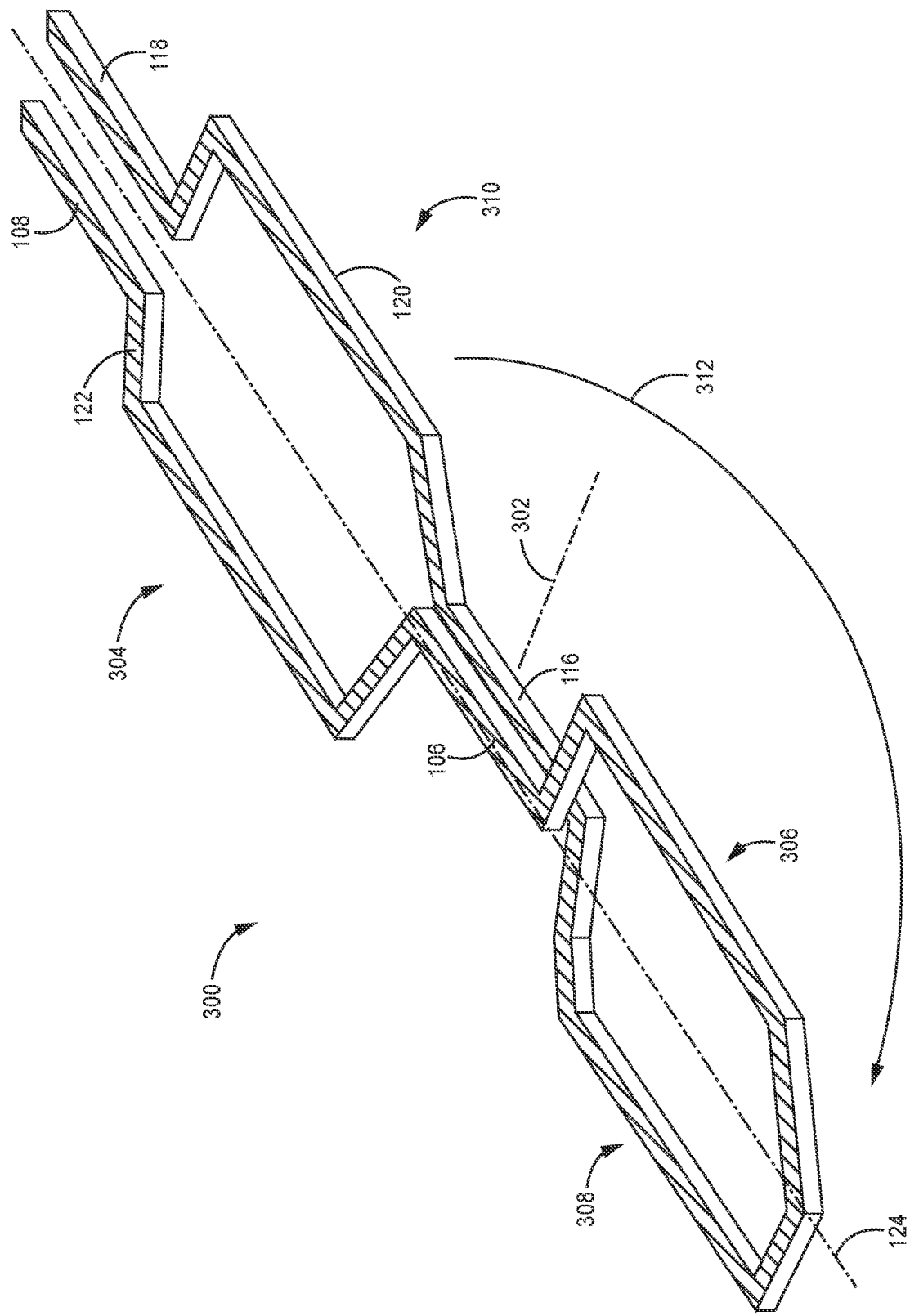
FIG. 3 is a perspective view illustrating an intermediate structure used in an embodiment of a method for forming the stator coil of FIG. 1A and FIG. 2.

FIG. 3 is a perspective view illustrating an intermediate structure 300 used in one embodiment of a method for forming the stator coil 100 of FIG. 1A and FIG. 2. Other appropriate methods can be used to construct stator coil 100, e.g., brazing separate conductors. However, in the embodiment of FIG. 3, a continuous length of conductor is formed into intermediate structure 300 with loops on either side of an inversion region and then folded in half to form the stator coil 100.

Intermediate structure 300 includes first termination 108 that is formed along central axis 124 of structure 300. First turn 102 is formed in two parts on either side of folding axis 302. A first half 304 of first turn 102 is formed as a half of a loop on the left side of central axis 124 in a first segment of the conductor that extends from first termination 108. First half 304 of first turn 102 is followed by inversion region 106 in another segment of the conductor of structure 300. First turn 102 is completed by another half loop formed in another segment of the conductor on a right side of central axis 124 to form a second half 306 of the first turn 102.

Second turn 104 is formed in a similar manner to first turn 102. Second turn 104 is formed in two parts on either side of folding axis 302. A first half 308 of second turn 104 is formed as a half of a loop on the left side of central axis 124 in a next segment of the conductor that extends from second half 306 of first turn 102. First half 308 of second turn 104 is followed by inversion region 116 in another segment of the conductor of structure 300. Inversion region 116 passes below and is parallel with inversion region 106 of first turn 102 such that inversion regions 106 and 116 form a stack. Second turn 104 is completed by another half loop formed in another segment of the conductor on a right side of central axis 124 to form a second half 310 of the second turn 104. Coil termination 118 extends from second half 310 of second turn 104.

Stator coil 100 of FIG. 2 is completed by folding inversion regions 106 and 116 of intermediate structure 300 around folding axis 302 in the direction of arrow 312. Specifically, first half 304 of first turn 102 and second half 310 of second turn 104 are folded under first half 308 of second turn 104 and second half 306 of first turn 102, respectively, bending intermediate structure 300 at the inversion regions 106 and 116.

Stator Coil with Three Turns

Figure 4A:
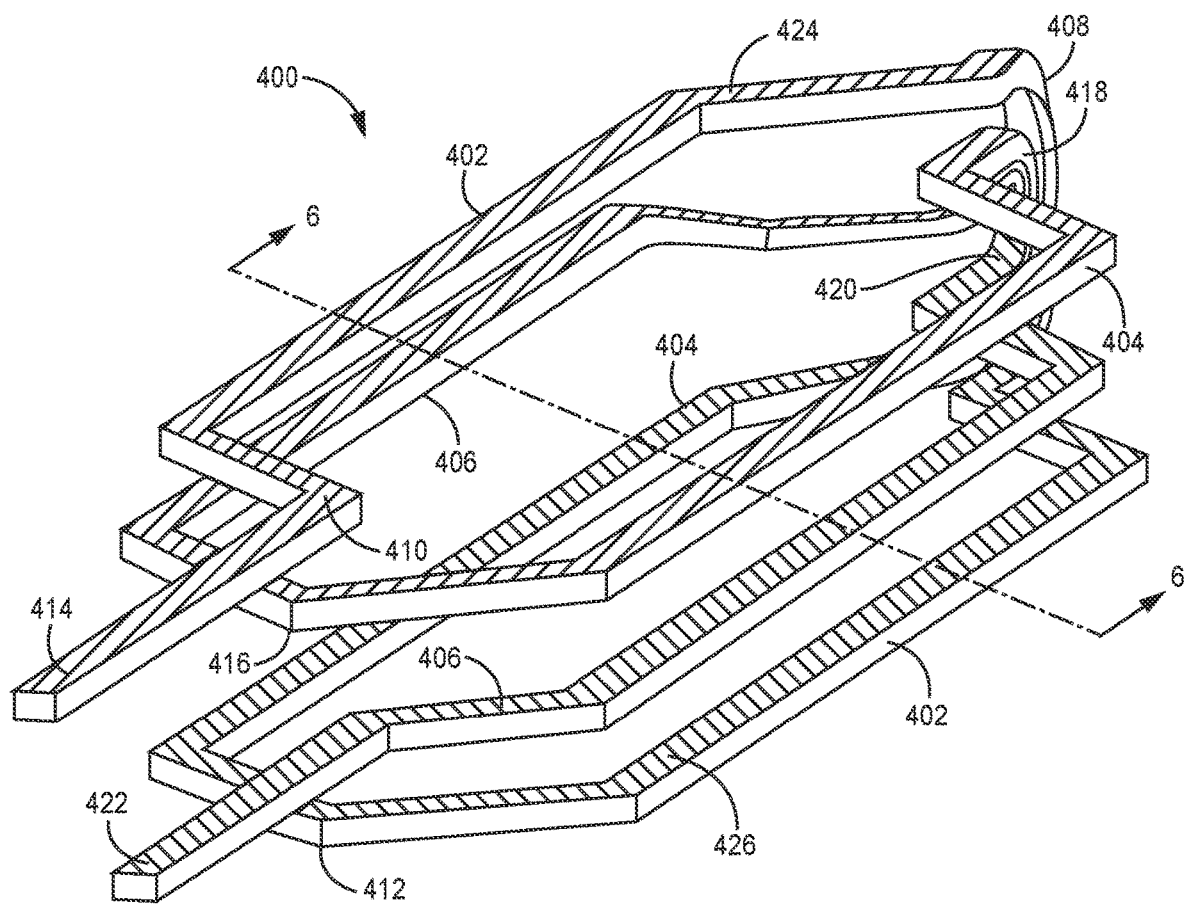
FIG. 4A is an exploded, perspective view of another embodiment of a stator coil having three turns with each turn having two or more strands, and with at least one turn being inverted relative to another of the three turns.

FIG. 4A is an exploded, perspective view of another embodiment of a stator coil, indicated at 400, having three turns with each turn having two or more strands, and with at least one turn being inverted relative to another of the three turns. In this embodiment, stator coil 400 includes three turns, first turn 402, second turn 404, and third turn 406. As with the embodiment having two turns described above, a "turn" is defined as a continuous length of conductor that forms a loop of the stator coil. For example, in this embodiment, first turn 402 begins at 410 and ends at 412 and includes the contiguous portion of the conductor between those two points. Additionally, first turn 402 also includes inversion region 408 and coil termination 414. Second turn 404 begins at 412 and ends at 416. Second turn 404 also includes inversion region 418. Third turn 406 begins at 416 and includes inversion region 420 and ends at coil termination 422.

For pedagogical purposes, stator coil 400 is shown in an exploded view in FIG. 4A to better show the structure of the inversion regions 408, 418, and 420 and the structure of the three turns. In this view, the conductors of the first, second, and third turns 402, 404 and 406 are shown with no contact between the turns. This allows the top and bottom surfaces 424 and 426 of the conductor that forms the turns to be seen. When fully constructed, first, second, and third turns 402, 404, and 406 are brought into contact as shown in in part in FIG. 4B.

The conductor that forms the three turns of stator coil 400 has first and second opposite sides or surfaces 424 and 426. The inversion regions change the relative position of the first and second sides 424 and 426 of the first, second and third turns 402, 404, and 406 in stator coil 400 in a similar manner as described above with respect to the embodiment of FIG. 1B. The result of the inversion regions is that the first and second sides of the first turn 402 are inverted relative to the first and second sides of the second turn 404 outside of their respective inversion regions 408 and 418.

As with the embodiment of FIGS. 1A and 1B, the conductor used to form stator coil 400 includes at least two strands. The strands of stator coil 400 are also substantially rectangular in cross section. Advantageously, this shape provides a better copper slot fill factor for stator coil 400 compared to other conductor shapes. Further, inverting at least one turn of stator coil 400 relative to at least one other turn reduces the AC losses in stator coil 400 compared to conventional designs for stator coils thereby producing a higher efficiency electric generator.

Figure 4B:
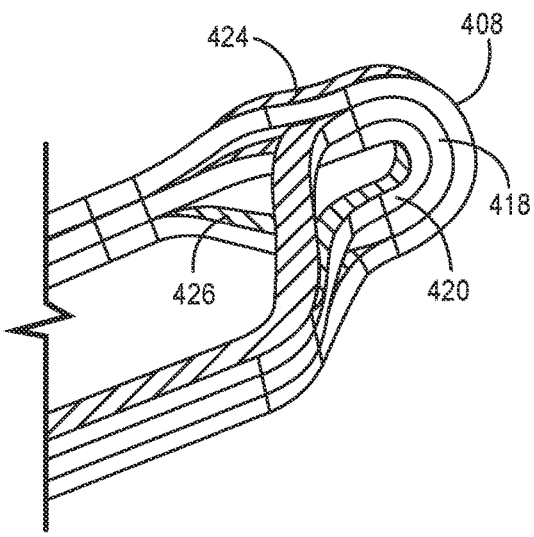
FIG. 4B is a perspective view of the stator coil of FIG. 4A.
Figure 5:
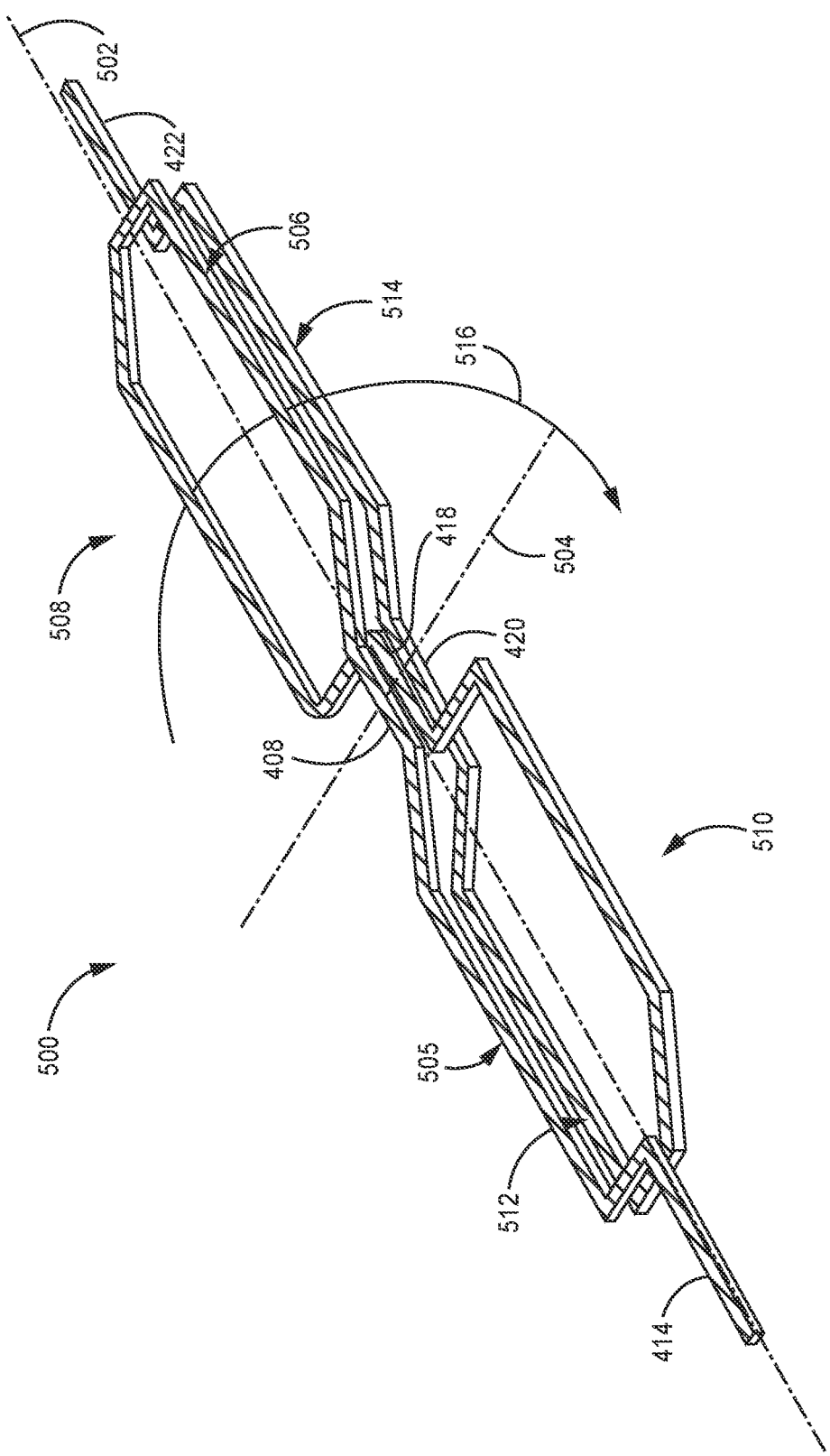
FIG. 5 is a perspective view illustrating an intermediate structure used in an embodiment of a method for forming the stator coil of FIGS. 4A and 4B.

FIG. 5 is a perspective view illustrating an intermediate structure 500 used in an embodiment of a method for forming the stator coil 400 of FIGS. 4A and 4B. In this embodiment, a continuous length of conductor is formed into intermediate structure 500 with loops on either side of an inversion region and then folded in half to form the stator coil 400.

Intermediate structure 500 includes first termination 414 that is formed along central axis 502 of structure 500. First turn 402 is formed in two parts on either side of folding axis 504. A first half 505 of first turn 402 is formed as a half of a loop on the left side of central axis 502 in a first segment of the conductor that extends from first termination 414. First half of first turn 402 is followed by inversion region 408 in another segment of the conductor of structure 500 that runs parallel with central axis 502. First turn 402 is completed by another half loop formed in another segment of the conductor on a right side of central axis 502 to form a second half 506 of the first turn 402.

Second turn 404 is formed in a similar manner to first turn 402. Second turn 404 is formed in two parts on either side of folding axis 504. A first half 508 of second turn 404 is formed as a half of a loop on the left side of central axis 502 in a next segment of the conductor that extends from second half 506 of first turn 402. First half 508 of second turn 404 is followed by inversion region 418 in another segment of the conductor of structure 500. Inversion region 418 passes below and is parallel with inversion region 408 of first turn 402 to form a stack. Second turn 404 is completed by another half loop formed in another segment of the conductor on a right side of central axis 502 to form a second half 510 of the second turn 404.

Third turn 406 is formed in a similar manner to first turn 402 and second turn 404. Third turn 406 is formed in two parts on either side of folding axis 504. A first half 512 of third turn 406 is formed as a half of a loop on the left side of central axis 502 in a next segment of the conductor that extends from second half 510 of second turn 404. First half 512 of third turn 406 is followed by inversion region 420 in another segment of the conductor of structure 500. Inversion region 420 passes below and is parallel with inversion region 418 of second turn 404 to add to the stack including inversion regions 408 and 418. Third turn 406 is completed by another half loop formed in another segment of the conductor on a right side of central axis 502 to form a second half 514 of the third turn 406. Coil termination 422 extends from second half 514 of third turn 406.

Stator coil 400 of FIGS. 4A and 4B is completed by folding inversion regions 408, 418, and 420 of intermediate structure 500 around folding axis 504 in the direction of arrow 516. Specifically, second half 506 of first turn 402 and second half 514 of third turn 406, and first half 508 of second turn 404 are folded under second half 510 of second turn 404 and first half 505 of first turn 404, and first half 512 of third turn 406, respectively, bending intermediate structure 500 at the inversion regions 408, 418, and 420.

Figure 6A:
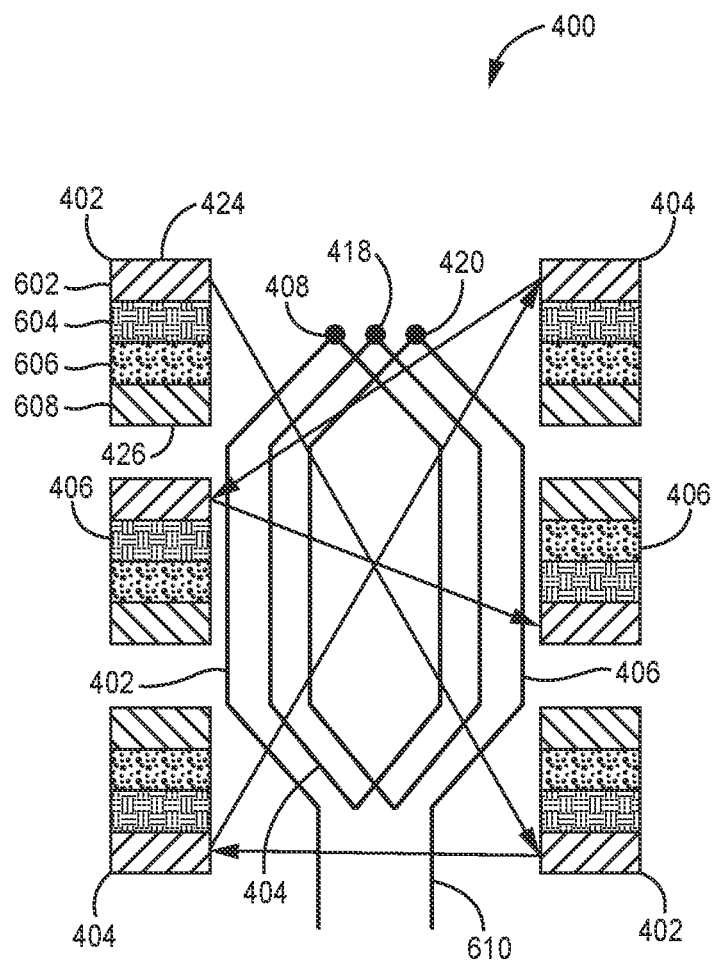
FIG. 6A is a schematic and cross section diagram of the stator coil of FIGS. 4A and 4B.

FIG. 6A is a combination of a schematic diagram and a partial cross section view of the stator coil 400 of FIGS. 4A and 4B. In this representation, stator coil 400 is illustrated as including three turns: first turn 402, second turn 404, and third turn 406. The turns are shown in cross section taken along a line 6-6 in FIG. 4A and each include four strands. The strands 602, 604, 606, and 608 are shown with a substantially rectangular cross section to provide the advantage of a high copper slot fill factor.

Stator Coil 400 is also illustrated schematically as a single conductor 610 that forms the three turns 402, 404 and 406. Turns 402, 404, and 406 in this embodiment, include inversion regions, 408, 418, and 420, respectively. Each of the inversion regions is illustrated schematically as a dot on the conductor 610 on the portion of conductor 610 that forms the respective turn 402, 404, and 406. As explained above, the inversion regions enable the reduction of AC losses in stator coil 400 by inverting the conductor 610 so that the top and bottom surfaces are different for the various turns in stator coil 400. In this embodiment, strand 602 includes first surface 424 of stator coil 400. Additionally, strand 608 includes surface 426. Surfaces 424 and 426 are inverted in the various turns of stator coil 400 as illustrated in FIG. 6A to reduce the AC losses in stator coil 400 compared to conventional designs for stator coils.

Figure 6B:
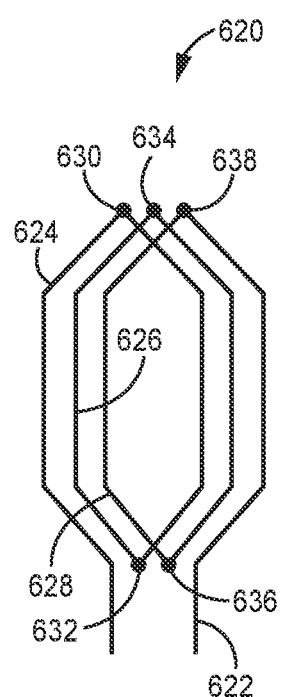
FIGS. 6B and 6C are schematic diagrams of alternate embodiments of stator coils with three turns.

The embodiments described above include a single inversion in each turn. In other embodiments, more than one inversion is included in a single turn of the stator coil. For example, FIG. 6B is a schematic diagram that illustrates the locations of inversions in another embodiment of a stator coil, indicated generally at 620. Stator coil 620 is formed from conductor 622 that is made of two or more strands having substantially rectangular cross section. In this embodiment, stator coil 620 also has three turns: 624, 626, and 628. Each turn, has at least one inversion region in which conductor 622 is inverted so that the top and bottom sides of the conductor 622 are reversed in position. The inversion regions are illustrated with a dot on conductor 622. In this embodiment, first turn 624 includes inversions at both ends of turn 624, indicated at 630 and 632. Second turn 626 also includes inversions at both ends of turn 626, indicated at 634 and 636. Third turn 628 only has one inversion indicated at 638.

By including inversion regions in the turns in the embodiment of FIG. 6B, first and second sides on at least one turn are inverted relative to another turn to provide reduced AC losses and thus more efficient operation of the associated electric generator.

Figure 6C:
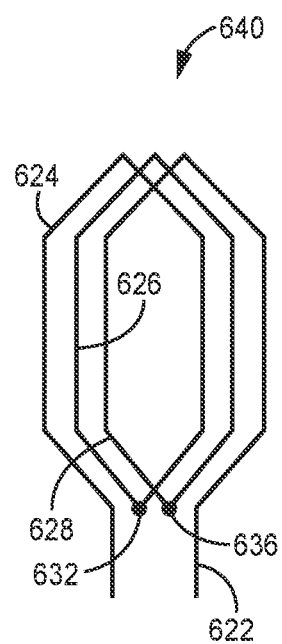

In another embodiment, illustrated in FIG. 6C, inversions are only provided at the end of coil 640 that provides the termination of the coil. Specifically, in this embodiment, inversions 630, 634 and 638 are removed compared to the embodiment of FIG. 6B and only two inversions are provided. Namely, coil 640, in this embodiment, includes inversion 632 between the first turn 624 and second turn 626, and inversion 636 between second turn 626 and third turn 628. As with the embodiment of FIG. 6B, the use of inversion regions in the turns in the embodiment of FIG. 6C inverts first and second sides on at least one turn relative to another turn to provide reduced AC losses and thus more efficient operation of the associated electric generator.

Stator Coil with Four Turns

Figure 7:
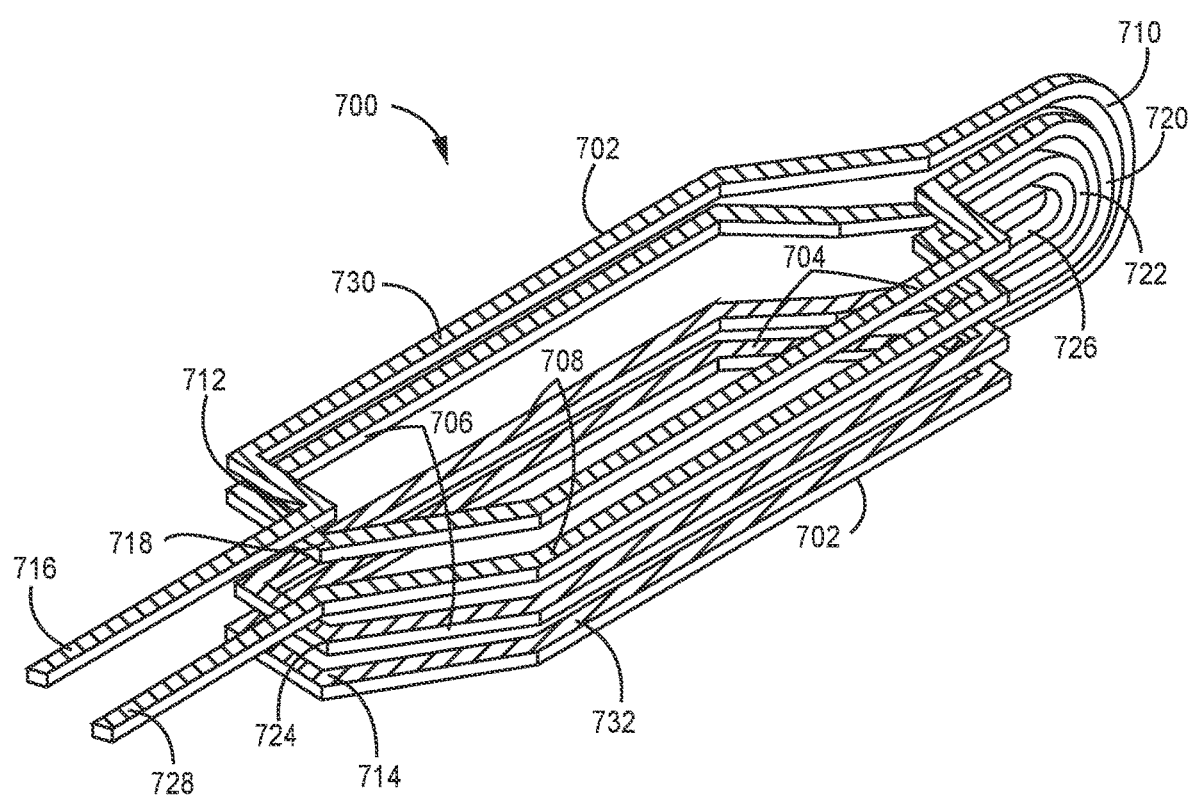
FIG. 7 is perspective view of another embodiment of a stator coil having four turns with each turn having two or more strands, and with at least one turn being inverted relative to another turn.

FIG. 7 is an exploded, perspective view of another embodiment of a stator coil, indicated generally at 700, having four turns with each turn having two or more strands, and with at least one turn being inverted relative to another turn. In this embodiment, stator coil 700 includes four turns: first turn 702, second turn 704, and third turn 706. As with the embodiments described above, a "turn" is defined as a continuous length of conductor that forms a loop of the stator coil. For example, in this embodiment, first turn 702 begins at 712 and ends at 714 and includes the contiguous portion of the conductor between those two points. Additionally, first turn 702 also includes inversion region 710 and coil termination 716. Second turn 704 begins at 714 and ends at 718. Second turn 704 also includes inversion region 720. Third turn 706 begins at 718 and includes inversion region 712 and ends at 724. Finally, fourth turn 708 begins at 724, passes through inversion region 726 and ends in coil termination 728.

For pedagogical purposes, stator coil 700 is shown in an exploded view in FIG. 7 to better show the structure of the inversion regions 710, 720, 722, and 726 and the structure of the four turns. In this view, the conductors of the first, second, third and fourth turns 702, 704 706 and 708 are shown with no contact between the turns. This allows the top and bottom surfaces 730 and 732 of the conductor that forms the turns to be seen. When fully constructed, first, second, third and fourth turns 702, 704 706 and 708 are brought into contact like the other embodiments described above.

The conductor that forms the four turns of stator coil 700 has first and second opposite sides or surfaces 730 and 732. The inversion regions change the relative position of the first and second sides 730 and 732 of the first, second, third and fourth turns 702, 704 706 and 708 in stator coil 700 in a similar manner as described above with the other embodiments. The result of the inversion regions is that the first and second sides of the first turn 702 are inverted relative to the first and second sides of the second turn 704 outside of their respective inversion regions 710 and 720.

As with the embodiment of FIGS. 1A and 1B, the conductor used to form stator coil 700 includes at least two strands. The strands of stator coil 700 are also substantially rectangular in cross section. Advantageously, this shape provides a better copper slot fill factor for stator coil 700 compared to other conductor shapes. Further, inverting at least one turn of stator coil 700 relative to at least one other turn reduces the AC losses in stator coil 700 compared to conventional designs for stator coils thereby producing a higher efficiency electric generator.

Figure 8:
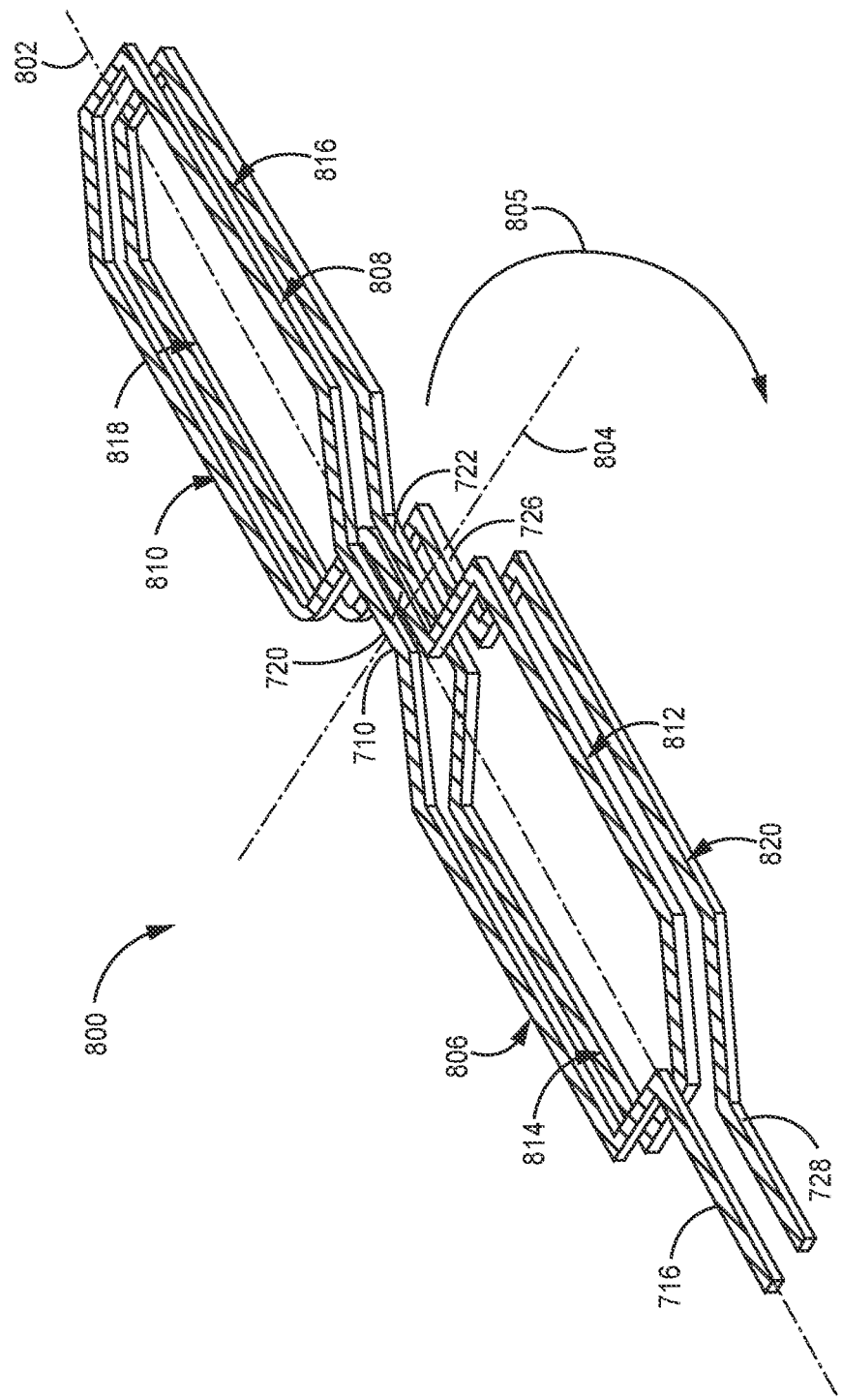
FIG. 8 is a perspective view illustrating an intermediate structure used in an embodiment of a method for forming the stator coil of FIG. 7.

FIG. 8 is a perspective view illustrating an intermediate structure 800 used in an embodiment of a method for forming the stator coil 700 of FIG. 7. In this embodiment, a continuous length of conductor is formed into intermediate structure 800 with loops on either side of an inversion region and then folded in half to form the stator coil 700.

Intermediate structure 800 includes first termination 716 that is formed along central axis 802 of structure 800. First turn 702 is formed in two parts on either side of folding axis 804. A first half 806 of first turn 702 is formed as a half of a loop on the left side of central axis 802 in a first segment of the conductor that extends from first termination 716. First half of first turn 702 is followed by inversion region 710 in another segment of the conductor of structure 800 that runs parallel with central axis 802. First turn 702 is completed by another half loop formed in another segment of the conductor on a right side of central axis 802 to form a second half 808 of the first turn 702.

Second turn 704 is formed in a similar manner to first turn 702. Second turn 704 is formed in two parts on either side of folding axis 804. A first half 810 of second turn 704 is formed as a half of a loop on the left side of central axis 802 in a next segment of the conductor that extends from second half 808 of first turn 702. First half 810 of second turn 704 is followed by inversion region 720 in another segment of the conductor of structure 800. Inversion region 720 passes below and is parallel with inversion region 710 of first turn 702. Second turn 704 is completed by another half loop formed in another segment of the conductor on a right side of central axis 802 to form a second half 812 of the second turn 704.

Third turn 706 is formed in a similar manner to first turn 702 and second turn 704. Third turn 706 is formed in two parts on either side of folding axis 804. A first half 814 of third turn 706 is formed as a half of a loop on the left side of central axis 802 in a next segment of the conductor that extends from second half 812 of second turn 704. First half 814 of third turn 706 is followed by inversion region 722 in another segment of the conductor of structure 800. Inversion region 722 passes below and is parallel with inversion region 720 of second turn 704. Third turn 706 is completed by another half loop formed in another segment of the conductor on a right side of central axis 802 to form a second half 816 of the third turn 706.

Finally, fourth turn 708 is formed in a similar manner to other turns of stator coil 700. fourth turn 708 is formed in two parts on either side of folding axis 804. A first half 818 of fourth turn 708 is formed as a half of a loop on the left side of central axis 802 in a next segment of the conductor that extends from second half 816 of third turn 706. First half 818 of fourth turn 708 is followed by inversion region 726 in another segment of the conductor of structure 1200. Inversion region 726 passes below and is parallel with inversion region 722 of third turn 706. Inversion regions 710, 720, 722, and 726 are positioned to form a stack aligned with central axis 802 and centered on folding axis 804. Fourth turn 708 is completed by another half loop formed in another segment of the conductor on a right side of central axis 802 to form a second half 820 of the fourth turn 708. Coil termination 728 extends from second half 820 of fourth turn 708.

Stator coil 700 of FIG. 7 is completed by folding inversion regions 710, 720, 722, and 726 of intermediate structure 800 around folding axis 804 in the direction of arrow 805. Specifically, the half of structure 800 located to the right of folding axis 804 is folded under the half of structure 800 on the left side of axis 804 resulting in stator coil 700 of FIG. 7.

Stator Coil Formed by Brazing Between Turns

Figure 9A:
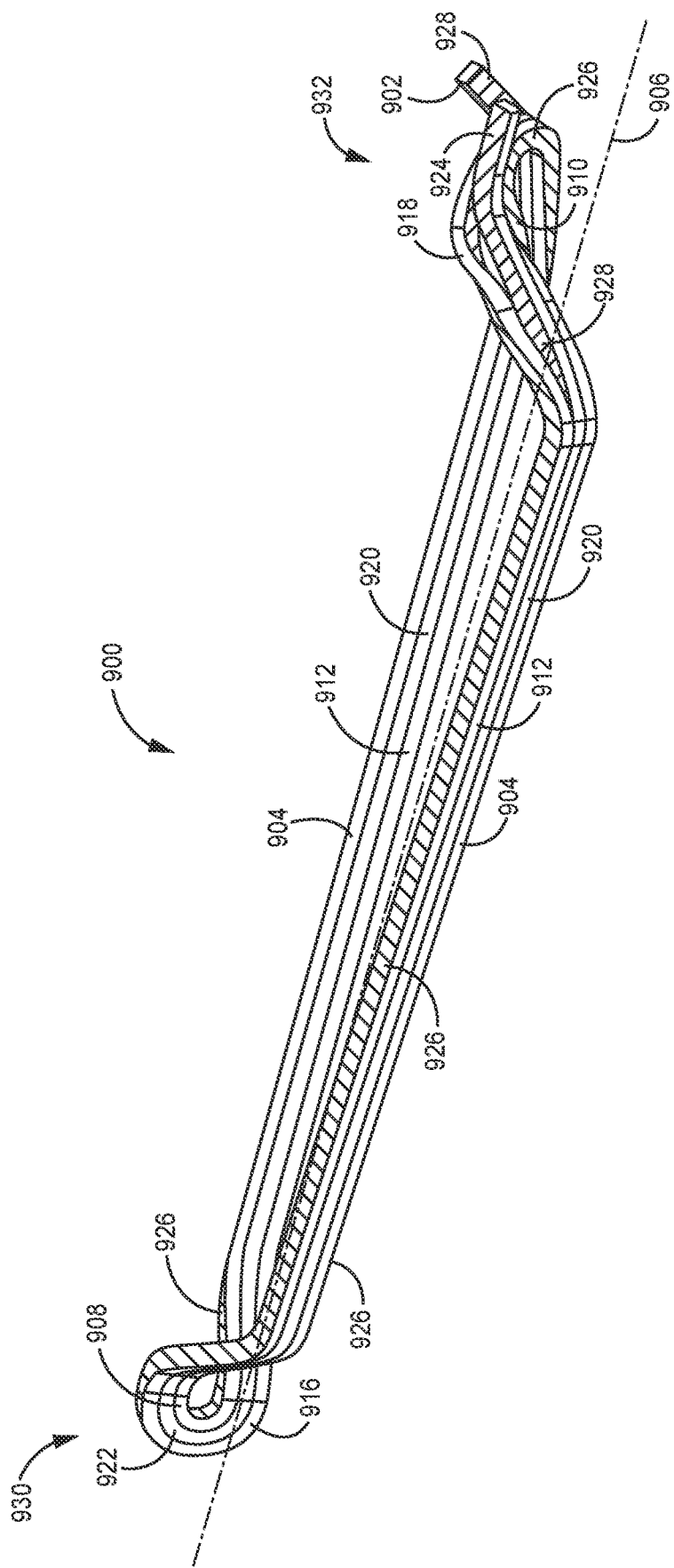
FIG. 9A is a perspective view of another embodiment of a stator coil having three turns with each turn having two or more strands, and with the turns being inverted and connected with brazing.

FIG. 9A is a perspective view of another embodiment of a stator coil, indicated generally at 900, having three turns formed from lengths of a conductor, with each length of conductor having two or more strands. The turns of stator coil 900 are inverted at a first end 930 of stator coil 900 and selectively interconnected with brazing at a second end 932 to form the stator coil 900. Stator coil 900 also includes coil terminations 902 and 924 located at second end 932. To better illustrate the orientation of the surfaces in the brazing of the turns at second end 932, termination 924 is not shown in FIG. 9B In this embodiment, stator coil 900 includes three turns, first turn 904, second turn 912, and third turn 920. As with the embodiment described above, a "turn" is defined as a continuous length of conductor that forms a loop of the stator coil. For example, in this embodiment, the conductor forming first turn 904 begins at coil termination 902. The conductor of first turn 904 proceeds parallel to central axis 906 and enters inversion region 908. Inversion region 908 inverts the orientation of the conductor forming first turn 904. In other words, surface 926 of the conductor forming first turn 904 enters inversion region 908 on top of the conductor and exits inversion region 908 on the bottom the conductor After exiting inversion region 908, the conductor that forms first turn 904 extends parallel to central axis 906 to brazing region 910. At brazing region 910, the conductor forming first turn 904 with surface 926 on bottom (see FIG. 9B) is brazed to the conductor forming second turn 912. When brazing the conductors of first turn 904 and second turn 912, each strand of the conductor of first turn 904 is brazed with the corresponding strand of the conductor of second turn 912. The brazing of the various strands are staggered and are coated with insulating materials such as Heresite and wrapped with insulation tape such as Kapton tape.

The conductor forming second turn 912 extends from brazing region 910 parallel to central axis 906 and enters inversion region 916 with surface 926 on the bottom. The conductor forming second turn 912 exits the inversion region 916 with its surfaces inverted so that first surface 926 is on top of second turn 912. In this orientation, second turn 912 extends along central axis 906 to brazing region 918 with surface 926 on top (See FIG. 9B). At brazing region 918, the conductor forming second turn 912 is brazed to the conductor forming third turn 920.

The conductor forming third turn 920 extends from brazing region 918 parallel to central axis 906 and enters inversion region 922 with surface 926 on the top. The conductor forming third turn 920 exits the inversion region 922 with its surfaces inverted so that second surface 928 is on top of the third turn 920. Third turn 920 extends in a direction toward second end 932 parallel to central axis 906 and ends at second coil termination 92 with surface 928 on top. Thus, third turn 920 has its surfaces inverted relative to at least one other turn. Advantageously, this reduces AC losses in stator coil 900 and, when incorporated into an electric generator (such as electric generator 1100 of FIG. 11), produces an electric generator with a higher efficiency compared to conventional stator designs.

Figure 9B:
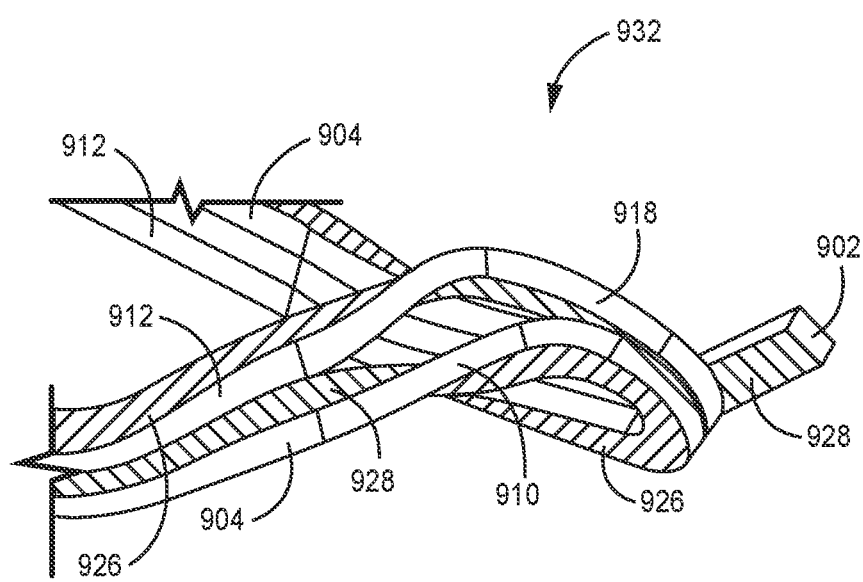
FIG. 9B illustrates a region of the stator coil of FIG. 9A where the turns are brazed together to form the stator coil.
Figure 10A:
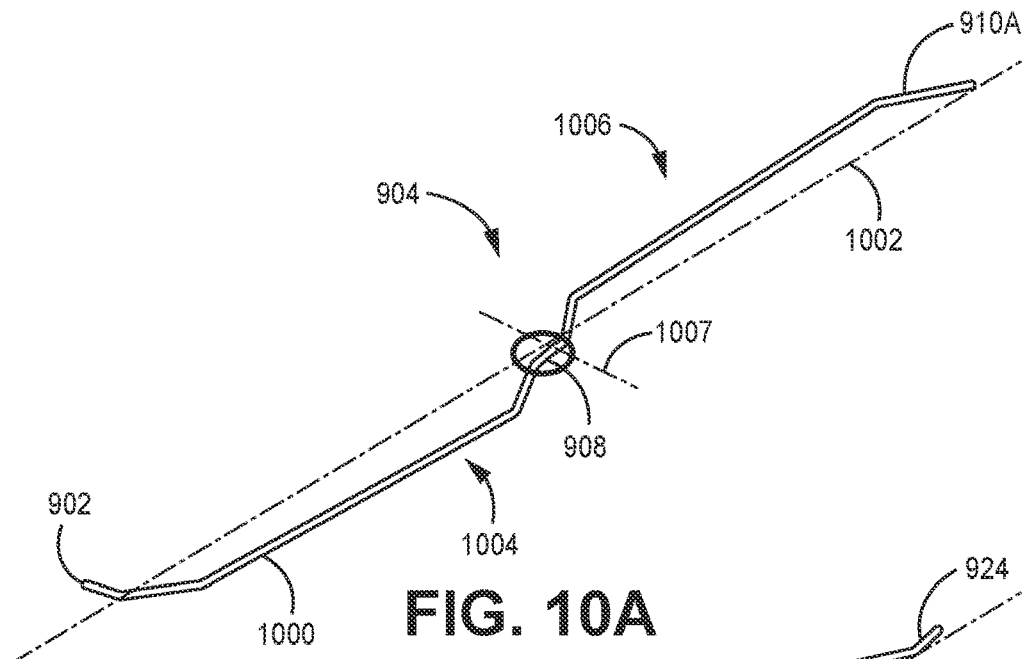
FIGS. 10A, 10B and 10C illustrate an embodiment of a method for manufacturing the stator coil of FIGS. 9A and 9B.
Figure 10B:
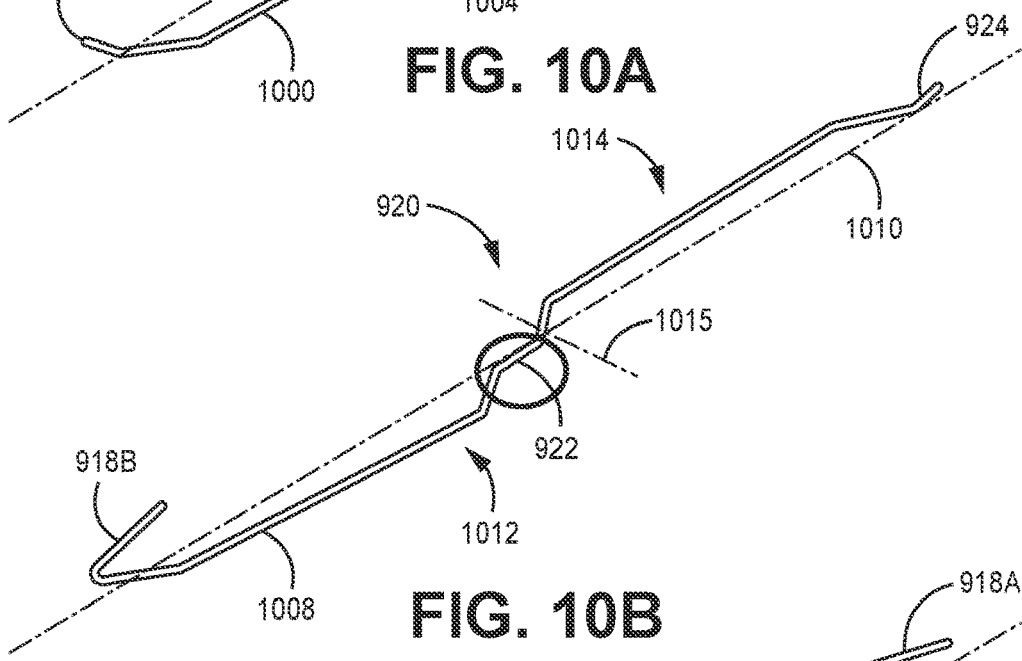
Figure 10C:
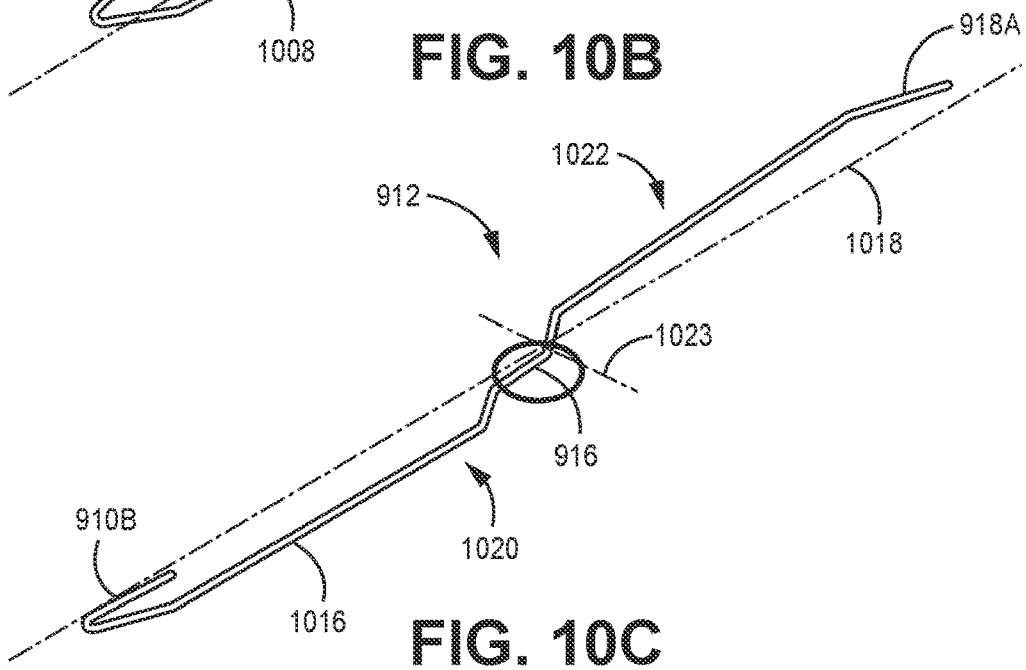

FIGS. 10A, 10B and 10C illustrate an embodiment of a method for manufacturing the stator coil 900 of FIGS. 9A and 9B. In this method, stator coil 900 is formed from three separate conductors, 1000, 1008, and 1016, that are brazed together to form the contiguous conductor of stator coil 900. First turn 904 is formed by bending conductor 1000 to include a first half 1004 of first turn 904 extending from termination 902 on a right side of center axis 1002. Additionally, conductor 1000 is bent so that it crosses over center axis 1002 at folding axis 1007 forming inversion region 908.

Further, conductor 1000 is bent to form a second half 1006 of first turn 904 on the left side of central axis 1002 ending with brazing region 910A. Similarly, third turn 920 is formed by bending conductor 1008 to include a first half 1012 of third turn 920 on a right side of center axis 1002 extending from brazing area 918B. Additionally, conductor 1008 is bent so that it crosses over center axis 1010 at folding axis 1015 forming inversion region 922. Further, conductor 1008 is bent to form a second half 1014 of third turn 920 on the left side of central axis 1010 ending with coil termination 924. Finally, second turn 912 is formed by bending conductor 1016 to include a first half 1020 extending from brazing region 910B of second turn 912 on a right side of center axis 1018 extending from brazing area 918B. Additionally, conductor 1016 is bent so that it crosses over center axis 1018 at folding axis 1023 forming inversion region 916. Further, conductor 1016 is bent to form a second half 1022 of second turn 912 on the left side of central axis 1018 ending with brazing region 918A.

Stator coil 900 is fabricated by stacking conductors 1000, 1008, and 1016 such that inversion regions 908, 922, and 916 line up with conductor 1000 on top, conductor 1008 in the middle and conductor 1016 on the bottom. Conductors 1000, 1008 and 1016 are folded around folding axes 1007, 1015, and 1023, respectively. Brazing region 910A of conductor 1000 (first turn 904) is brazed to brazing area 910B of conductor 1016 (second turn 912) to form brazing region 910 of FIGS. 9A and 9B. Further, brazing region 918A of conductor 1016 is brazed to brazing region 918B of conductor 1008 (third turn 920) to form brazing region 918 of FIGS. 9A and 9B and to complete fabrication of the stator coil 900.

The embodiment of FIGS. 9A, 9B, 10A, 10B, and 10C is described with respect to having three turns with the turns selectively interconnected at end 932 using brazing to form a single conductive coil between coil terminations 902 and 924. It is noted that in other embodiments, any appropriate number of turns can be implemented between coil terminations 902 and 924 by stacking and selectively interconnecting the turns through brazing or by any other appropriate technique so that the surfaces of at least one turn are inverted relative to the surfaces of at least one additional turn outside the inversion region of the stator coil.

It is noted that in this disclosure, several embodiments of a stator coil have been disclosed that are formed by folding ("folded embodiments") an intermediate structure in half to create the coil with the sides of one turn being inverted relative to the sides of at least one other turn in an area outside of an inversion region. Embodiments with two, three and four turns have been disclosed as illustrated in FIGS. 1A, 1B, 2, 3, 4A, 4B, 5, 6A, 6B, 6C, 7 and 8. Further, an embodiment that uses brazing ("brazed embodiment") to enable the inversion among three turns in FIGS. 9A, 9B, 10A, 10B, and 10C. It is understood that the present application is not limited to two, three or four turns in a stator coil using either the brazed or the folded embodiments. Any appropriate number of turns may be included in a stator coil according to the teachings of the present invention. Further, it is also understood that in these so-called folded embodiments as well as the brazed embodiments the length of the conductor in each inversion region is selected to enable folding of the conductor such that the first turn and the at least one additional turn are aligned in the final structure.

Electric Machine

Figure 11:
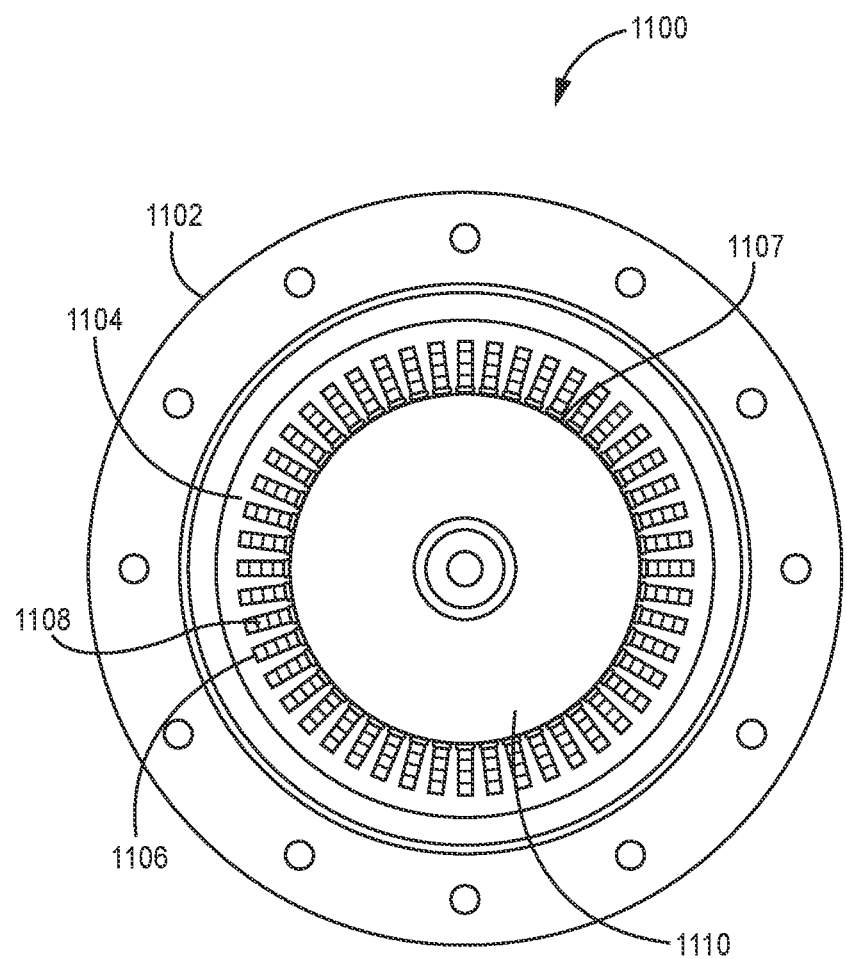
FIG. 11 is a front view of an embodiment of an electric generator including stator coils according to the teachings of the present invention.

FIG. 11 is a front view of an embodiment of an electric machine, e.g., an electric generator or electric motor, indicated generally at 1100, and including stator coils 1108 according to the teachings of the present invention. Electric machine 1100 includes housing 1102. Stator 1104 is disposed within housing 1102. Stator 1104 includes a plurality of stator slots 1106 that are disposed around an interior perimeter 1107 of stator 1104. Each stator slot 1106 is adapted to be filled with a stator coil 1108 constructed according to the teachings of the present invention. For example, stator coils 1108 may be constructed as shown and described above with respect to one or more of FIG. 1A, 1B, 2, 3, 4A, 4B, 5, 6A, 6B, 6C, 7, 8, 9A, 9B, 10A, 10B, or 10C. Electric machine 1100 also includes a rotor 1110 disposed within the stator 1104 that causes a magnetic field to rotate within the stator 804 thereby generating electricity in the stator coils 1108 of electric machine 1100.

As described above, stator coils 1108 are designed to reduce AC losses compared to conventional designs. This increases the efficiency of the electric machine 1100 thereby reducing heat generation. With the reduction in heat generation, electric machine 1100 can be cooled with a smaller cooling system, thereby enabling use of electric machine 1100 at full power for extended periods of time in systems that benefit from a generator with a small form factor.

EXAMPLE EMBODIMENTS

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

Example 1 includes a stator coil, comprising: a first turn with two or more strands, the first turn having first and second opposite sides, a coil termination at a first end of the first turn and an inversion region; at least one additional turn with two or more strands, the at least one additional turn having first and second opposite sides, and an inversion region located adjacent to the inversion region of the first turn; and wherein the first and second sides of the first turn are inverted relative to the first and second sides of the at least one additional turn outside their respective inversion regions.

Example 2 includes the stator coil of example 1, wherein one of the at least one additional turn includes a second coil termination.

Example 3 includes the stator coil of any of examples 1-2, wherein each strand of the two or more strands of the first turn and the two or more strands of the at least one additional turn each have a rectangular cross-section.

Example 4 includes the stator coil of any of examples 1-3, wherein the first turn and the at least one additional turn each include no more than one inversion.

Example 5 includes the stator coil of any of examples 1-4, wherein at least one of the first turn and the at least one additional turn includes more than one inversion.

Example 6 includes the stator coil of any of examples 1-5, and further including a brazed connection between the first turn and the at least one additional turn opposite the inversion region of the first turn.

Example 7 includes the stator coil of example 6, wherein each strand in the brazed connection is separately brazed and insulated.

Example 8 includes the stator coil of any of examples 1-7, wherein each inversion region is disposed at the first end of its respective turn or at a second end, opposite the coil termination.

Example 9 includes a method for forming a stator coil, the method comprising: forming a first segment of a conductor having two or more strands into a half of a loop on a first side of an axis to form a first half of a first turn; forming a second segment of the conductor, connected to the first segment, and extending along the axis to form an inversion region of the first turn; forming a third segment of the conductor into a half of a loop on a second side of the axis to form a second half of the first turn; forming a fourth segment of the conductor into a half of a loop on the first side of the axis to form a first half of at least one additional turn; forming a fifth segment of the conductor, connected to the fourth segment, and extending along the axis to form an inversion region for the at least one additional turn; forming a sixth segment of the conductor into a half of a loop on the second side of the axis to form a second half of the at least one additional turn; wherein the conductor has first and second opposite surfaces; folding the conductor at the inversion region of the first and the at least one additional turn; wherein first and second sides of the first turn are inverted relative to first and second sides of the at least one additional turn outside of the inversion region.

Example 10 includes the method of example 9, wherein the inversion regions of the first turn and the at least one additional turn form a stack.

Example 11 includes the method of any one of examples 9-10, wherein the inversion region of the first turn and the inversion region of the at least one additional turn each has a length set to enable folding of the conductor such that the first turn and the at least one additional turn are aligned.

Example 12 includes the method of any one of examples 9-11, and further including forming a first coil termination coupled to a leading end of the first turn and a second coil termination coupled to a trailing end of the at least one additional turn.

Example 13 includes the method of any one of examples 9-12, and further comprising forming additional turns in segments of the conductor with first and second half loops and an inversion region in between the first and second half loops of each additional turn.

Example 14 includes the method of example 13, wherein the inversion region of each additional turn is stacked below the inversion region of the prior turn.

Example 15 includes a method for forming a stator coil, the method comprising: forming a first turn having two or more strands, first and second opposite sides, a coil termination end, an inversion region and a brazing region; forming at least one additional turn, the at least one additional turn having two or more strands, first and second opposite sides, an inversion region and at least one brazing region; stacking the first turn and the at least one additional turn; folding the first turn and the at least one additional turn at their respective inversion regions; and selectively brazing the first turn with the at least one additional turn at their respective brazing regions such that the first and second sides of the first turn are inverted relative to the first and second sides of the at least one additional turn.

Example 16 includes the method of example 15, wherein the at least one additional turn has a coil termination end.

Example 17 includes the method of any of examples 15-16, wherein selectively brazing comprises separately brazing each strand in the first turn with a corresponding strand in the at least one additional turn.

Example 18 includes the method of any of examples 15-17, wherein forming at least one additional turn comprises forming two or more additional turns.

Example 19 includes the method of any of examples 15-18, wherein forming a first turn having two or more strands comprises forming a first turn having two or more strands with rectangular cross sections.

Example 20 includes an electric machine, comprising: a housing; a stator disposed in the housing; a rotor, disposed in the stator; a plurality of stator coils disposed in a plurality of slots in the stator; and wherein the plurality of stator coils includes at least one stator coil including: a first turn with two or more strands, the first turn having first and second opposite sides, a coil termination at a first end of the first turn and an inversion region; at least one additional turn with two or more strands, the at least one additional turn having first and second opposite sides, and an inversion region located adjacent to the inversion region of the first turn; and wherein the first and second sides of the first turn are inverted relative to the first and second sides of the at least one additional turn outside their respective inversion regions.

The invention claimed is:

1. A method for forming a stator coil, the method comprising:
   forming a first turn from a conductor having two or more layered parallel strands with a first part of the first turn on a first side of a folding axis and a second part of the first turn on a second side of the folding axis, the first part and the second part of the first turn interconnected with a first inversion region;
   forming at least one additional turn from the conductor coupled to the first turn and including a first part formed on the second side of the folding axis and a second part of the at least one additional turn formed on the first side of the folding axis, the first part and the second part of the at least one additional turn interconnected with a second inversion region that forms a stack with the first inversion region; and
   folding the first turn and the at least one additional turn at the first inversion region and the second inversion region, respectively, around the folding axis.

2. The method of claim 1, wherein forming the first turn includes forming the first part of the first turn on a first side of a central axis and forming the second part of the first turn on a second side of the central axis.

3. The method of claim 1, wherein forming the first turn and forming the at least one additional turn comprises forming the first turn and the at least one additional turn from the conductor having first and second opposite surfaces.

4. The method of claim 3, wherein, after folding, the first and second opposite surfaces of the first turn are inverted relative to the first and second opposite surfaces of overlapping portions of the at least one additional turn outside their respective inversion regions.

5. The method of claim 1, and further comprising forming additional turns with first and second parts on opposite sides of the folding axis and an inversion region in between the first and second parts.

6. The method of claim 1, wherein forming the first turn comprises forming the first turn from the conductor having two or more parallel strands having substantially rectangular cross sections and extending across a full width of the first turn.

7. The method of claim 1, wherein the first inversion region and the second inversion region are vertically stacked.

8. The method of claim 1, wherein folding the first turn and the at least one additional turn comprises folding parts of the first turn and parts of the at least one additional turn on the second side of the folding axis under parts of the first turn and parts of the at least one additional turn on the first side of the folding axis.

9. A method of forming a stator coil, the method comprising:
- forming a first turn in two parts on either side of a folding axis with a first inversion region coupling the two parts of the first turn;
- forming at least one additional turn in two parts on either side of the folding axis with a second inversion region coupling the two parts of the at least one additional turn;
- wherein the first turn and the at least one additional turn are formed from a common conductor having two or more layered, parallel strands with first and second opposite surfaces; and
- folding the first turn and the at least one additional turn at the first inversion region and the second inversion region, respectively, around the folding axis.

10. The method of claim 9, wherein forming the first turn includes forming a first part of the first turn on a first side of a central axis and forming a second part of the first turn on a second side of the central axis.

11. The method of claim 10, wherein, after folding, the first and second opposite surfaces of the first turn are inverted relative to the first and second opposite surfaces of overlapping portions of the at least one additional turn outside their respective inversion regions.

12. The method of claim 9, and further comprising forming additional turns in two parts on opposite sides of the folding axis and an inversion region in between the two parts.

13. The method of claim 9, wherein forming the first turn comprises forming the first turn from the common conductor having two or more parallel strands having substantially rectangular cross sections and extending across a full width of the first turn.

14. The method of claim 9, wherein the first inversion region and the second inversion region are vertically stacked.

15. The method of claim 9, wherein folding the first turn and the at least one additional turn comprises folding parts of the first turn and parts of the at least one additional turn on a second side of the folding axis under parts of the first turn and parts of the at least one additional turn on a first side of the folding axis.

16. A method for forming a stator coil, the method comprising:
- forming a first turn from a conductor having two or more layered parallel strands with a first part of the first turn on a first side of a folding axis and a second part of the first turn on a second side of the folding axis, the first part and the second part of the first turn interconnected with a first inversion region;
- forming at least one additional turn from a conductor having two or more layered parallel strands and including a first part formed on the second side of the folding axis and a second part of the at least one additional turn formed on the first side of the folding axis, the first part and the second part of the at least one additional turn interconnected with a second inversion region that forms a vertical stack with the first inversion region;
- folding the first turn and the at least one additional turn at the first inversion region and the second inversion region, respectively, around the folding axis; and
- selectively brazing the first turn with the at least one additional turn.

17. The method of claim 16, wherein selectively brazing comprises separately brazing each strand of the two ore more layered parallel strands in the first turn with a corresponding strand of the two or more layered parallel strands in the at least one additional turn.

18. The method of claim 16, wherein forming the at least one additional turn comprises forming two or more additional turns.

19. The method of claim 16, wherein forming the first turn having the two or more layered parallel strands comprises forming the first turn having the two or more layered parallel strands with substantially rectangular cross sections.

20. The method of claim 16, wherein selectively brazing comprises selectively brazing the first turn with the at least one additional turn at brazing regions such that the first turn is inverted relative to overlapping portions of the at least one additional turn outside their respective inversion regions.

* * * * *